United States Patent
Rojanskiy et al.

(10) Patent No.: US 9,359,899 B2
(45) Date of Patent: Jun. 7, 2016

(54) DRIVE SHAFT SYSTEM

(75) Inventors: Henrikh Rojanskiy, Or Akiva (IL); Amnon Levy, Ramat HaSharon (IL)

(73) Assignee: I.D.E. TECHNOLOGIES LTD., Kadima (IL)

(*) Notice: Subject to any disclaimer, the term of this patent is extended or adjusted under 35 U.S.C. 154(b) by 0 days.

(21) Appl. No.: 13/823,684

(22) PCT Filed: Sep. 21, 2011

(86) PCT No.: PCT/IB2011/054139
§ 371 (c)(1),
(2), (4) Date: Mar. 14, 2013

(87) PCT Pub. No.: WO2012/042439
PCT Pub. Date: Apr. 5, 2012

(65) Prior Publication Data
US 2013/0195615 A1    Aug. 1, 2013

(30) Foreign Application Priority Data

Sep. 27, 2010   (EP) .................................... 10179954

(51) Int. Cl.
*F16C 23/00*   (2006.01)
*F01D 5/10*   (2006.01)
*F16C 25/06*   (2006.01)
(Continued)

(52) U.S. Cl.
CPC . *F01D 5/10* (2013.01); *F16C 25/06* (2013.01); *F16C 35/073* (2013.01); *F16C 35/077* (2013.01); *F16C 2326/06* (2013.01)

(58) Field of Classification Search
CPC ....... F16C 25/06; F16C 35/073; F16C 35/077
USPC ........... 464/167, 178; 384/517–519, 563, 900
See application file for complete search history.

(56) References Cited

U.S. PATENT DOCUMENTS 2,232,473 A * 2/1941 Pulleyblank ................. 384/518
3,485,540 A   12/1969 Nogle
(Continued)

FOREIGN PATENT DOCUMENTS

JP    62-41423 A  *  2/1987 ................... 384/518
WO   03086836 A2    10/2003
(Continued)

OTHER PUBLICATIONS

Written Opinion for PCT/IB2011/054139 dated Apr. 11, 2013.
(Continued)

*Primary Examiner* — Gregory Binda
(74) *Attorney, Agent, or Firm* — Symbus Law Group, LLC; Clifford D. Hyra

(57) ABSTRACT

A drive shaft system (100) comprising a shaft (80) connected to a motor via a coupling (50) and arranged to transmit a rotary movement from the motor to the rotor, at least two supports (65,75) arranged to position the shaft within a shaft housing (90), each support comprising at least one bearing (95,98), and at least one forcing element (135,145) arranged to force at least one of the supports against either an inner side of the shaft housing or an outer side of the shaft (80); such as to prevent turning and radial movements of the supports within the shaft housing while enabling axial movement of the shaft within the shaft housing. The bearings may be forced at either their inner or outer rings, and may be enclosed in a bearing housing (120) for protection and stiffness.

23 Claims, 13 Drawing Sheets

(51) Int. Cl.
*F16C 35/073* (2006.01)
*F16C 35/077* (2006.01)

(56) References Cited

U.S. PATENT DOCUMENTS 6,343,993 B1 * 2/2002 Duval et al. .................. 464/167
2009/0080823 A1 * 3/2009 Bauch et al. .................. 384/518

FOREIGN PATENT DOCUMENTS

| WO | WO 03/086836 | A2 | 10/2003 |
| WO | WO 2007/148338 | | 12/2007 |
| WO | 2009047973 | A1 | 4/2009 |
| WO | WO2009/047973 | A1 | 4/2009 |

OTHER PUBLICATIONS

European extended search report for corresponding EP Application No. 10179954.2, mailed Mar. 29, 2011.
PCT search report for corresponding PCT Application No. PCT/IB2011/054139, mailed Feb. 8, 2012.
PCT written opinion for corresponding PCT Application No. PCT/IB2011/054139, mailed Feb. 8, 2012.

* cited by examiner

DRIVE SHAFT SYSTEM

BACKGROUND

1. Technical Field

The present invention relates to the field of power transmission, and more particularly, to a drive shaft system.

2. Discussion of Related Art

FIGS. 1A-1D illustrate a prior art drive shaft system 99 transmitting torque and rotation from a motor 60 through a coupling 50 to a rotor 70, e.g. of a compressor. Coupling 50 comprises two spring systems 51A, 51B (FIG. 1B) that provide a flexible connection between the shaft of motor 60 and shaft 80.

Drive shaft system 99 comprises a shaft 80 supported by at least two supports 65, 75 in a shaft housing 90. Supports 65, 75 comprise bearings 95, 98 (respectively) that position shaft 80 within shaft housing 90.

In the illustrated example (FIGS. 1A-1D), rotor side support 75 has bearing 98 that is mounted in shaft housing 90, and motor side support 65 has bearing 95 that is preloaded by springs 97A. Preloading of bearing 95 prevents its skidding. FIG. 2A illustrates a prior art configuration, in which rotor side bearing 98 is preloaded by springs 97B. At least one of supports 65, 75 enables some axial movement (for example into gap 92 in FIG. 1D) to accommodate thermal expansion of shaft 80.

In a vertical configuration of drive shaft system 99, supports 65, 75 are loaded in an axial direction by the weights of rotor 70 and shaft 80 and in a radial direction by unbalance forces 91 illustrated in FIG. 2B.

Two wear processes are possible in prior art drive shaft systems 99 that cause early failure at supports 65, 75 due to wear of the adjacent face of shaft housing 90 and outer rings 96 of bearings 95, 98 (FIG. 2B). The first wear process results from a turning of at least one of bearings 95, 98 upon the action of radial forces associated with the starting of motor 60 in combination with the large moment of inertia of rotor 70 and the flexibility of coupling 50. The second wear process results from radial movements of at least one of bearings 95, 98 during the high frequency rotation of rotor 70. Wear to bearings 95, 98 and to the adjacent face of shaft housing 90 occurs due to the radial movements in gap 92 between bearings 95, 98 and shaft housing 90 (gap 92 represents some freedom due to installation of bearings 95, 98 in shaft housing 90 without interference fit). Gap 92 further enables accommodation of shaft 80 expansion when bearing 98 is fixed (FIG. 2C). A similar gap may occur between the inner ring of bearings 95, 98 and shaft 80.

Debris 93 that accumulates as result of the wear processes increases the friction between supports 65, 75 and shaft housing 90 and prevents axial movement. In this situation, the system is susceptible to damage resulting from increased axial forces acting upon supports 65, 75, such as forces due to thermal expansion of shaft 80, damage that shortens the operation time of drive shaft system 99 or even causes complete failure and damage to rotor 70 and/or motor 60.

Prior art comprises elements that mild wear, such as cooling drive shaft system 99, and lubricating or coating the contact areas between bearings 95, 98 and shaft housing 90, however these elements do not solve the fundamental problem.

WIPO Publication number WO 03/086836 relates to a worm gear for a steering wheel of a motor vehicle, whereby the automatic interlock is independent from the sense of direction of torque (M) acting upon a worm wheel of the worm gear. The publication teaches pushing the worm gear upon the worm wheel.

WIPO Publication number WO 2009/047973 discloses the prevention of damage of smearing over a wide use conditions including high speed rotation and light load, and facilitating assembling of a shaft supporting device. In a shaft supporting device having a cylindrical roller bearing built between a rotating shaft and a housing, recesses are formed along the axial direction on the inside diameter surface of the housing and the outside diameter surface of the outer ring of the cylindrical roller bearing to face each other under a state where the cylindrical roller bearing is built in, and a preload regulation component is inserted between the facing recesses. Radial cross-section at the inserting portion of the preload regulation component has such a region as the radial dimension increases depending on the rotation angle about the axis in the axial direction. When the preload regulation component is rotated about the axis, the outer ring is pressed to the inside diameter while being interposed between the facing recesses, thus increasing the radial clearance of the cylindrical roller bearing to the negative side and the preload regulation component is locked under the state where the radial clearance is increased. U.S. Pat. No. 3,485,540 teaches a self-aligning bearing support for the journal of a high speed rotatable shaft that is resiliently supported by annular steel spring means having a comparatively low spring rate radially and portions spaced circumferentially for the unrestricted passage of lubricating fluid therebetween. The spring is compressed radially between the bearing support and an outer housing, which are closely spaced radially at a plurality of circumferentially spaced locations to effect an annularly arranged movement limiting clearance in communication with and interrupted by a plurality of circumferentially spaced regions of large radial clearance which also communicate with the spacing between the springs and with a drain to render oil film squeeze damping nominal at the movement limiting clearance. The housing and bearing are interlocked against relative axial and rotational movement by a portion of the lubricating oil duct system.

BRIEF SUMMARY

One aspect of the invention provides a drive shaft system comprising a shaft, the shaft connected to a motor via a coupling and arranged to transmit a rotary movement from the motor to a rotor, the drive shaft system characterized in that: (i) the shaft is positioned by at least two supports within a shaft housing, each support comprising at least one bearing, (ii) at least one of the bearings is enclosed within a bearing housing installed within and axially moveable along the shaft housing, (iii) the drive shaft system further comprises at least one forcing element arranged to force the bearing housing against at least one of: an inner side of the shaft housing, and an outer side of the shaft by applying a radial force on the bearing housing, while enabling axial movement of the shaft within the shaft housing, and (iv) the at least one forcing element further comprises a stabilizer arranged to prevent turning and radial movements of the bearing housing while allowing axial movements of the bearing housing within the shaft housing.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

The present invention will be more readily understood from the detailed description of embodiments thereof made in conjunction with the accompanying drawings of which.

DETAILED DESCRIPTION

Figure 1A:
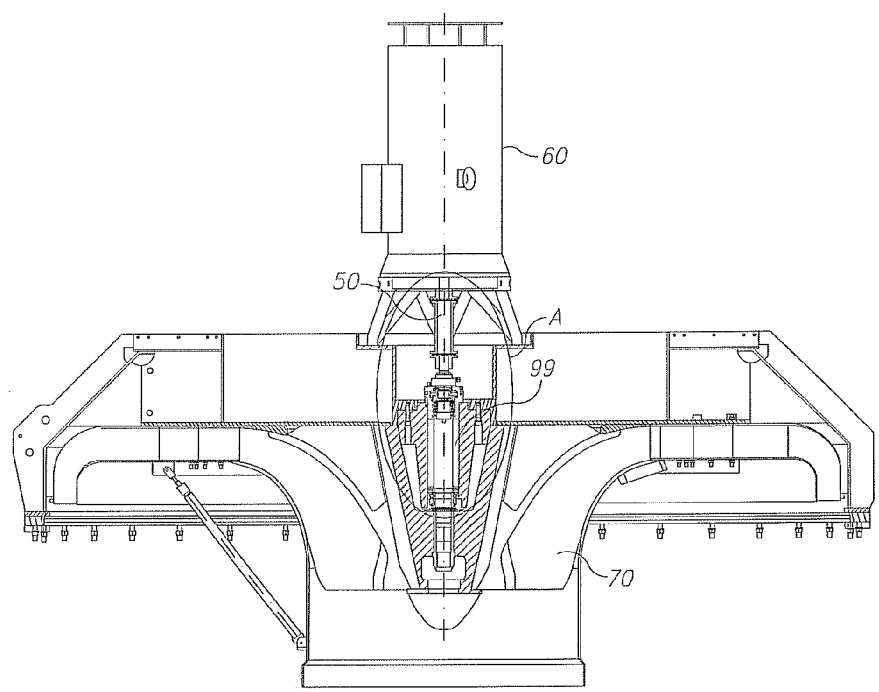
FIG. 1A is a cross sectional side view of a prior art drive shaft system.
Figure 1B:
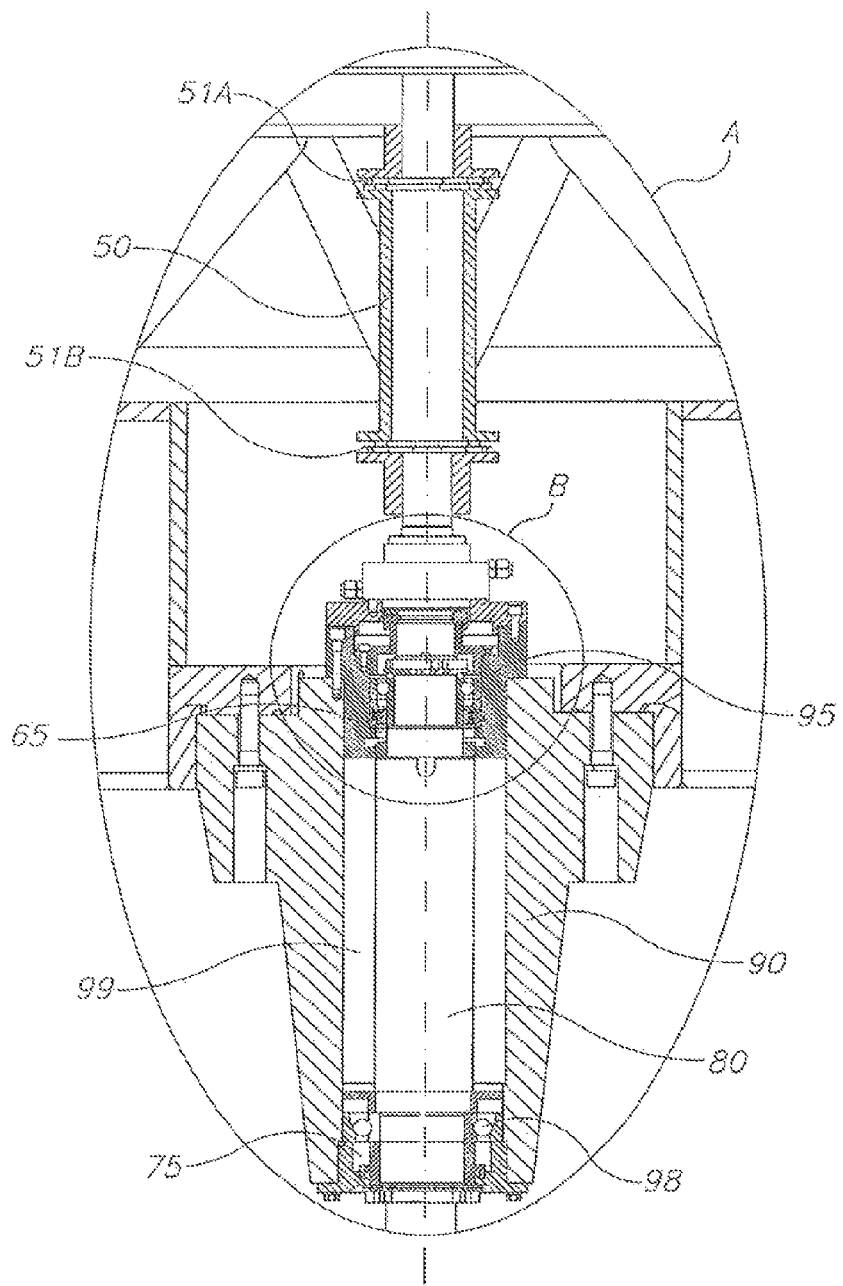
FIG. 1B is a cross sectional side view and detail of the prior art drive shaft system of FIG. 1A.
Figure 1C:
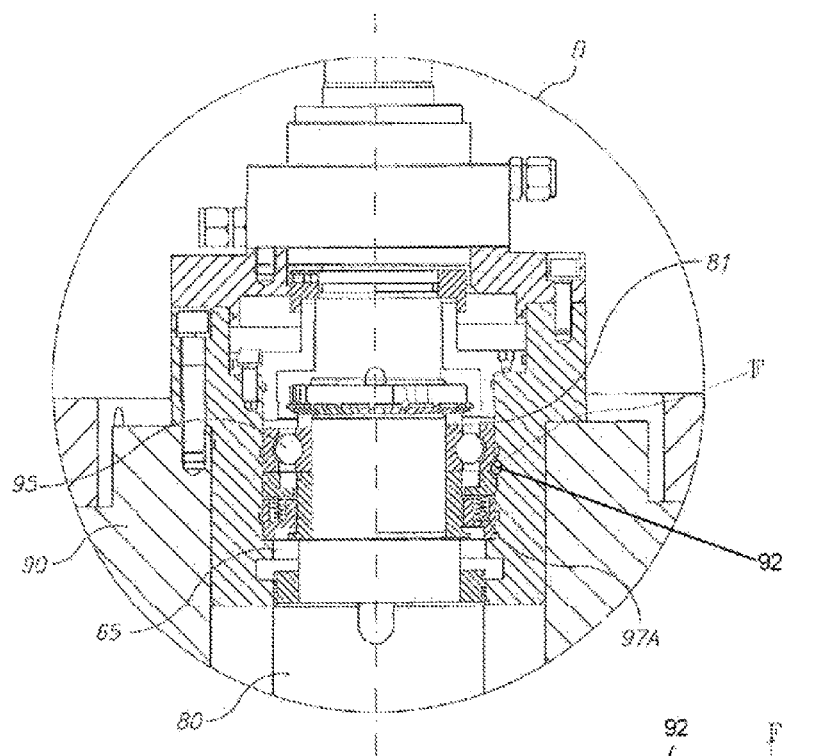
FIG. 1C is a cross sectional side view and detail of the prior art drive shaft system of FIG. 1B.
Figure 1D:
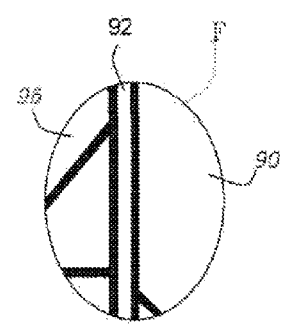
FIG. 1D is a cross sectional side view and detail of the area marked F on the prior art drive shaft system of FIG. 1C.
Figure 2A:
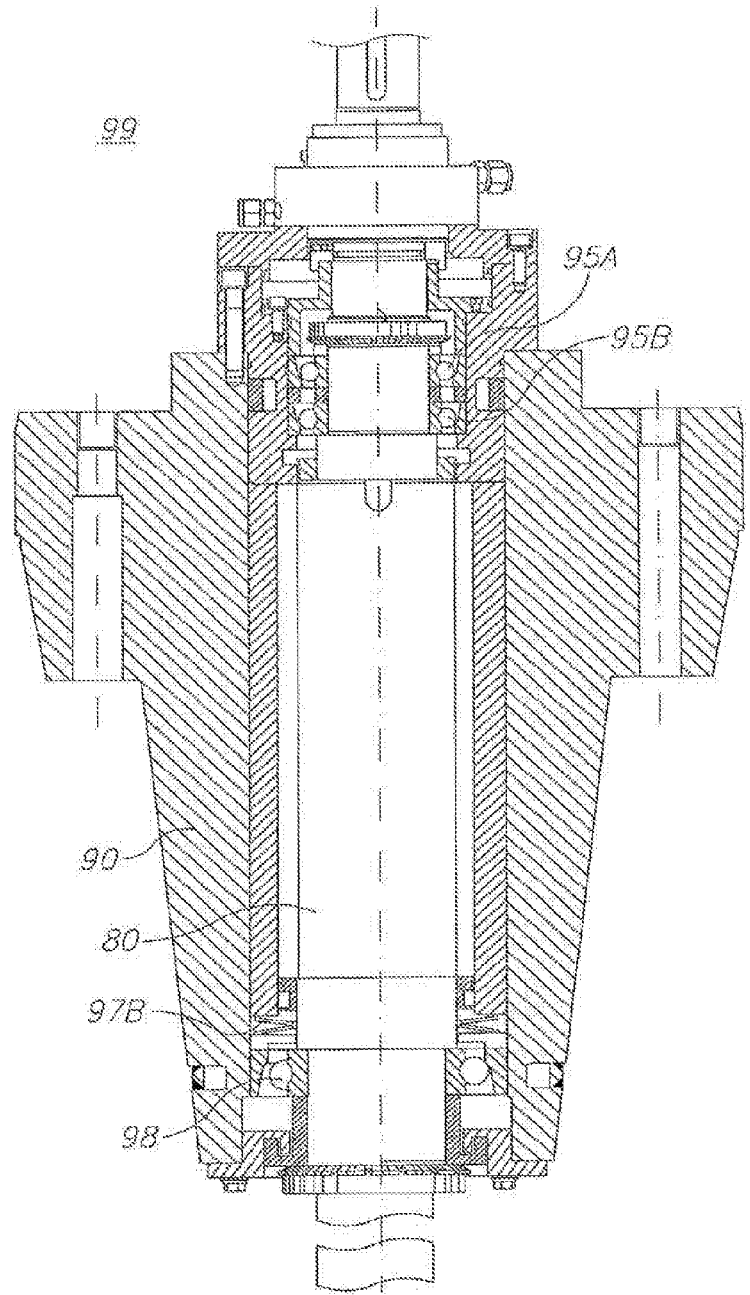
FIGS. 2A and 2B are cross sectional side views and details of a prior art drive shaft system.
Figures 2B, 2C:
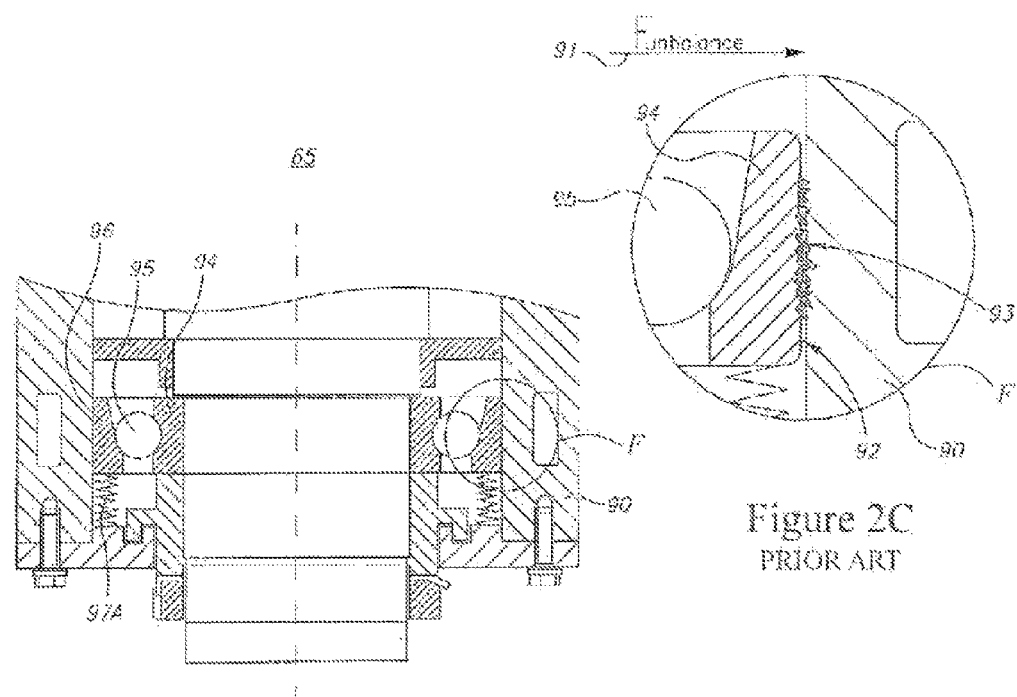
FIG. 2C is a cross sectional side view and detail of the area marked F on the prior art drive shaft system of FIG. 2B.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIGS. 3A-3I are cross sectional side views and details of a drive shaft system 100, according to one embodiment of the invention.

Figures 3A, 3B:
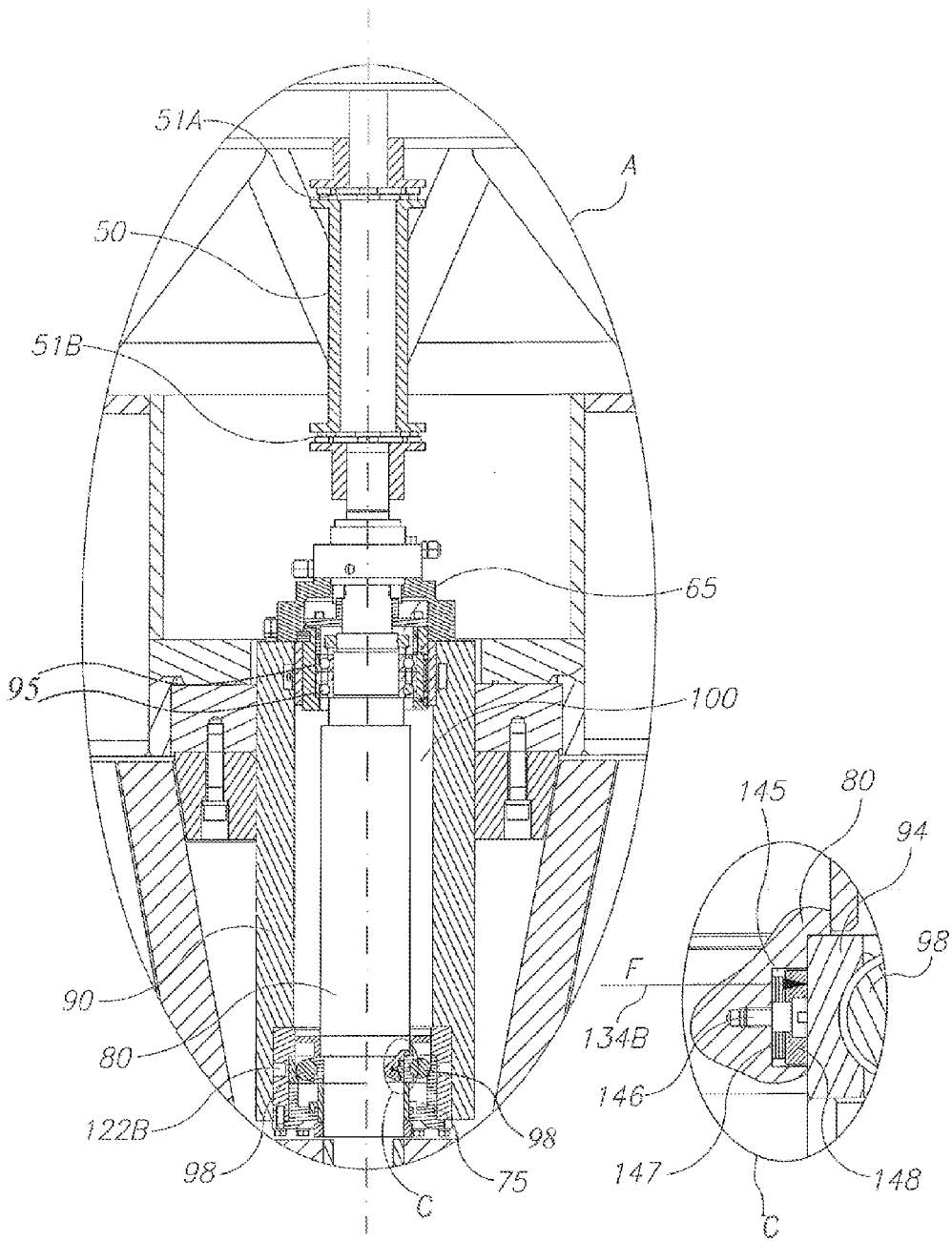
FIG. 3A is a cross sectional side view of a drive shaft system, according to one embodiment of the present invention.
FIG. 3B is a cross sectional side view and detail of the area marked C on the drive shaft system of FIG. 3A, according to one embodiment of the present invention.

FIG. 3A is a cross sectional side view of drive shaft system 100, according to some embodiments of the invention. Drive shaft system 100 transmits torque and rotation from the motor through coupling 50 to the rotor. Coupling 50 comprises two spring systems 51A, 51B that provide a flexible connection between the motor shaft and shaft 80. Shaft 80 is supported by at least motor side support 65 comprising bearings 95 (two bearings 95A and 95B in the illustrated example in FIG. 3C) and rotor side support 75 comprising bearing 98, supports 65, 75 position shaft 80 within shaft housing 90, such that at least one of supports is axially movable to accommodate axial thermal expansion of shaft 80.

Supports 65, 75 are arranged in the current invention to withstand without wear the following forces: the load resulting from the rotor and shaft 80's weight, a turning force during motor starts that is transmitted by flexible coupling 50, and radial unbalance forces during rotation of shaft 80.

Figures 3C, 3I:
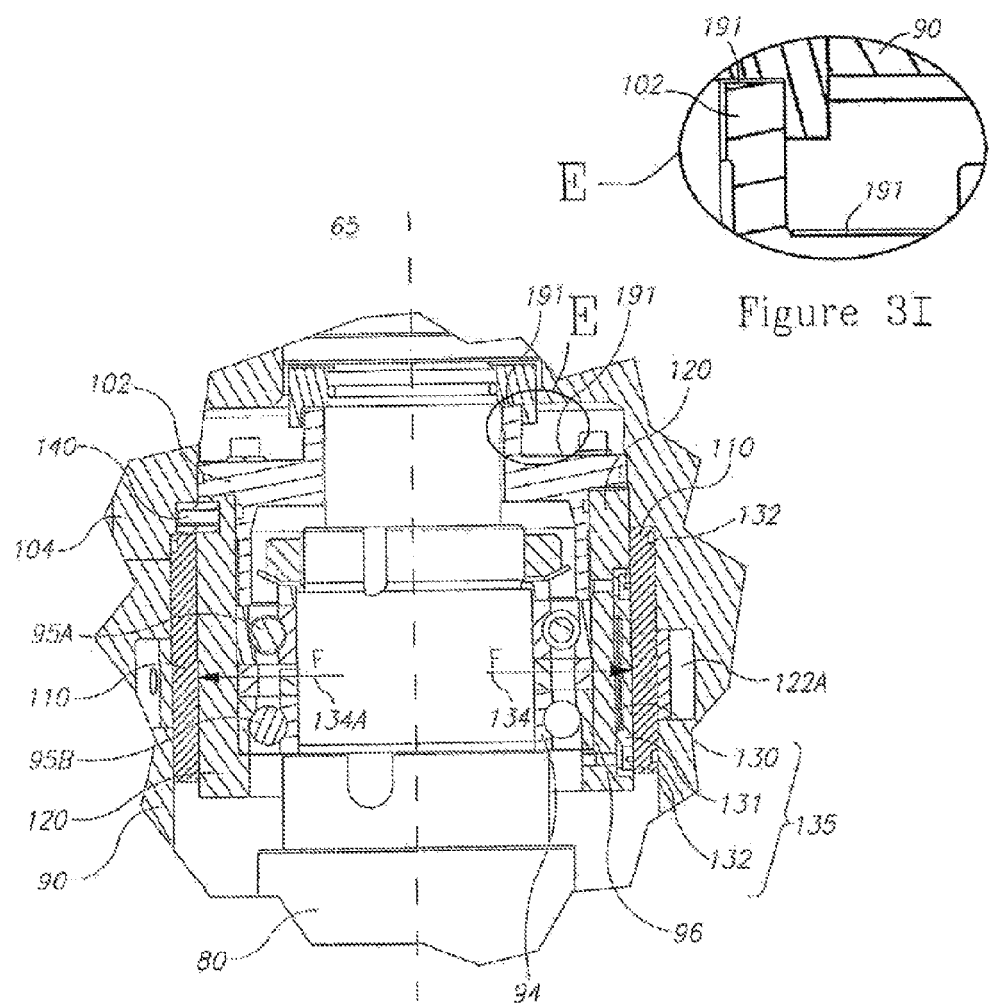
FIG. 3C is a cross sectional side view of a bearing housing of a drive shaft system, according to one embodiment of the present invention.
FIG. 3I is a cross-sectional side view and detail of the area marked E on the drive shaft system of FIG. 3C, according to one embodiment of the present invention.

FIGS. 3B, 3C and 3I illustrate details of forcing elements 135, 145 in drive shaft system 100 in cross sectional side views, according to some embodiments of the invention. FIG. 3B is an enlargement of the area marked C on FIG. 3A. FIG. 3I is an enlargement of the area marked E on FIG. 3C. Forcing element 135 (FIG. 3C) is arranged to force at least one of supports 65, 75 (e.g. outer rings 96 of bearings 95, 98) against the inner side of shaft housing 90 such as to prevent turning and radial movements of supports 65, 75 (e.g. bearings 95, 98) within shaft housing 90 while enabling axial movement of at least one of supports 65, 75 (e.g. bearings 95, 98) within shaft housing 90 to accommodate thermal expansion of shaft 80.

Forcing element 145 (FIG. 3B) is arranged to force at least one of supports 65, 75 (e.g. bearings 95, 98) against the outer side of shaft 80 such as to prevent turning and radial movements of supports 65, 75 (e.g. inner rings 94 of bearings 95, 98) in respect to shaft 80. Forcing element 145 is arranged to enable thermal expansion of shaft 80.

FIG. 3B illustrates an embodiment of forcing element 145 as a spring unit 147 installed within shaft 80 and forcing (by force 134B) inner ring 94 of bearing 98 against the outer face of shaft 80. Spring unit 147 is connected to shaft 80 via a screw 146 and presses plate 148 against inner ring 94 of bearing 98.

Force 134B applied to inner ring 94 is large enough to maintain contact of inner ring 94 and shaft 80, and still enables thermal expansion of shaft 80 in axial direction, without damage to bearing 98.

Forcing element 145 may comprise several spring units 147 installed around the perimeter of shaft 80 and forcing inner ring 94 at different points.

Forcing elements 145 may be installed in shaft 80 in contact with either motor side support 65 (bearings 95) or rotor side support 75 (bearing 98), or both.

Forcing elements 145 may be installed in shaft housing 90 and be in contact with outer ring 96 of bearing 98, to force forcing bearing 98 against the inner face of shaft housing 90. Several forcing elements 145 may be installed around the inner perimeter of shaft housing 90, and in contact of either or both supports 65, 75.

FIG. 3C illustrates a bearing housing 120 enclosing at least one of bearings 95 and installed within, and axially moveable along shaft housing 90. Bearing housing 120 is fixated by cover 102. FIG. 3C further illustrates forcing element 135 that is arranged to force (by force 134A) bearing housing 120 against the inner side of shaft housing 90 such as to prevent turning and radial movements of bearing housing 120 within shaft housing 90 while enabling axial movement of bearing housing 120 within shaft housing 90. FIG. 3C further illustrates a sleeve 110 that may be affixed to shaft housing 90. Bearing housing may be installed within, and be axially moveable along sleeve 110. Sleeve 110 may be characterized by improved surface features in respect to the inner side of shaft housing 90. Forcing element 135 is arranged to force bearing housing 120 against the inner side of sleeve 110 such as to prevent turning and radial movements of bearing housing 120 within sleeve 110 while enabling axial movement of bearing housing 120 within sleeve 110. Sleeve 110 may be installed in either motor side support 65 or rotor side support 75. In cases in which sleeves 110 are installed in both supports 65, 75, sleeves 110 are denoted be sleeve 110A and sleeve 110B (see FIG. 3G).

Forcing elements 135 and 145 are interchangeable, and their exact configuration in either support 65, 75 is to be determined in each application. Both supports 65 and 75 may have forcing elements 135, 145 installed, in either configuration. Bearing housing 120 may likewise be applied to enclose some or all bearings in either support. For the sake of simplicity, bearing(s) 95 and forcing element 135 were associated with motor side support 65 and bearing(s) 98 and forcing element 145 were associated with rotor side support 75, but these configurations are not to be understood as limiting the invention.

By forcing bearing 95, 98 to the inner side of shaft housing 90 (by force 134A), both turning and radial movements of bearings 95, 98 in shaft housing 90 are prevented, and thereby the wear to their contact areas is avoided.

The axial movement of bearing housing 120 is enabled by leaving gap 191 between bearing housing 120 installed within cover 102 and shaft housing 90 (see FIG. 3I).

Figure 3D:
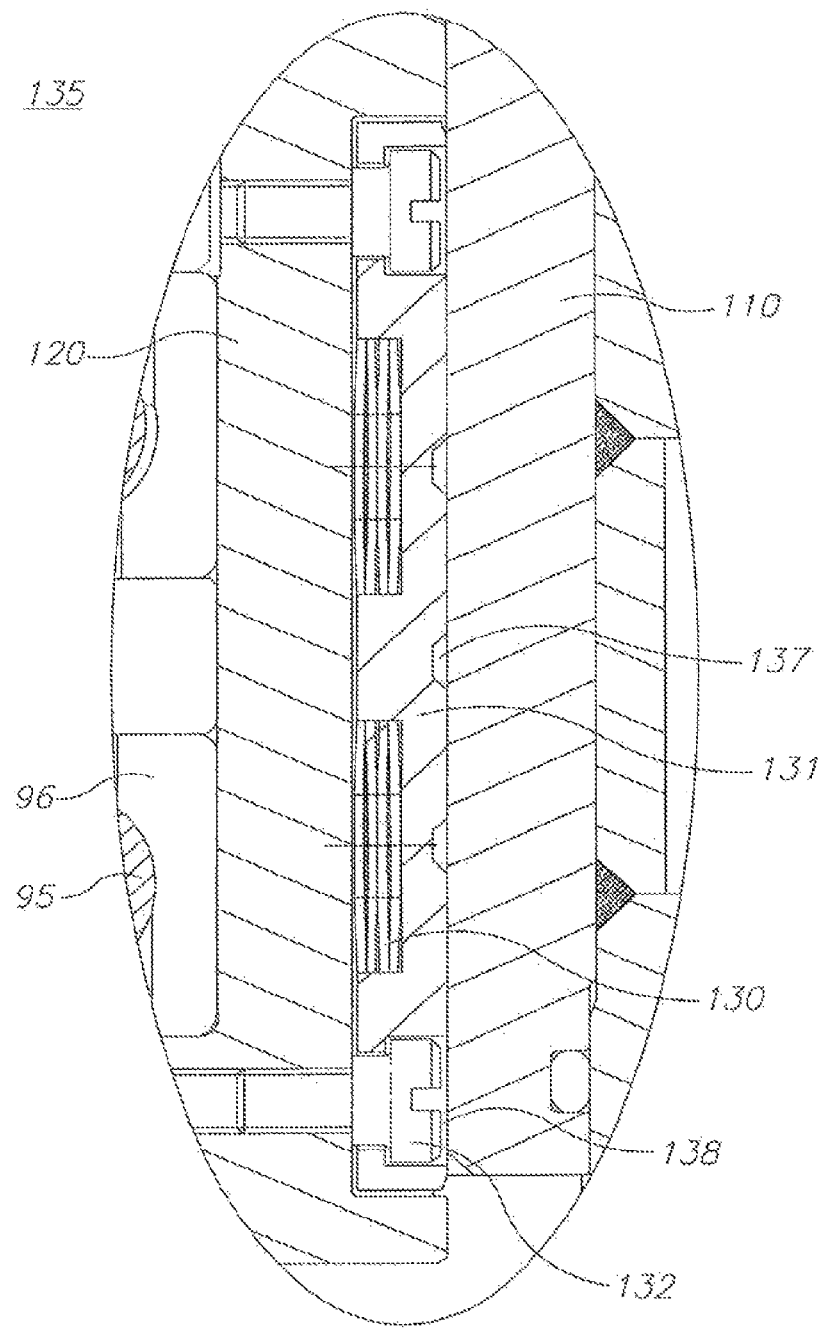
FIG. 3D is a cross sectional side view of a detail of a forcing element of a drive shaft system, according to one embodiment of the present invention.

FIG. 3D illustrates in detail an embodiment of forcing element 135. Forcing element 135 may comprise at least one spring unit 130 inserted between bearing housing 120 and sleeve 110, and arranged to force bearing housing 120 against the inner face of sleeve 110 in a radial direction.

Spring unit 130 may force a plate 131 fastened by screws 132 to bearing housing 120 against sleeve 110.

Spring unit 130 may comprise greasing slots 137 arranged to lubricate the interface between spring unit 130 and sleeve 110. Lubrication is needed to protect forcing element 135 from damage that may be caused by relative motion of bearing housing 120 and sleeve 110, such as axial motion of bearing housing 120.

Forcing element 135 may further comprise a stabilizer 140 arranged to prevent turning and radial movements of bearing housing 120 within sleeve 110 while allowing axial movements of bearing housing 120 and increase the stiffness of support 65.

Figure 3E:
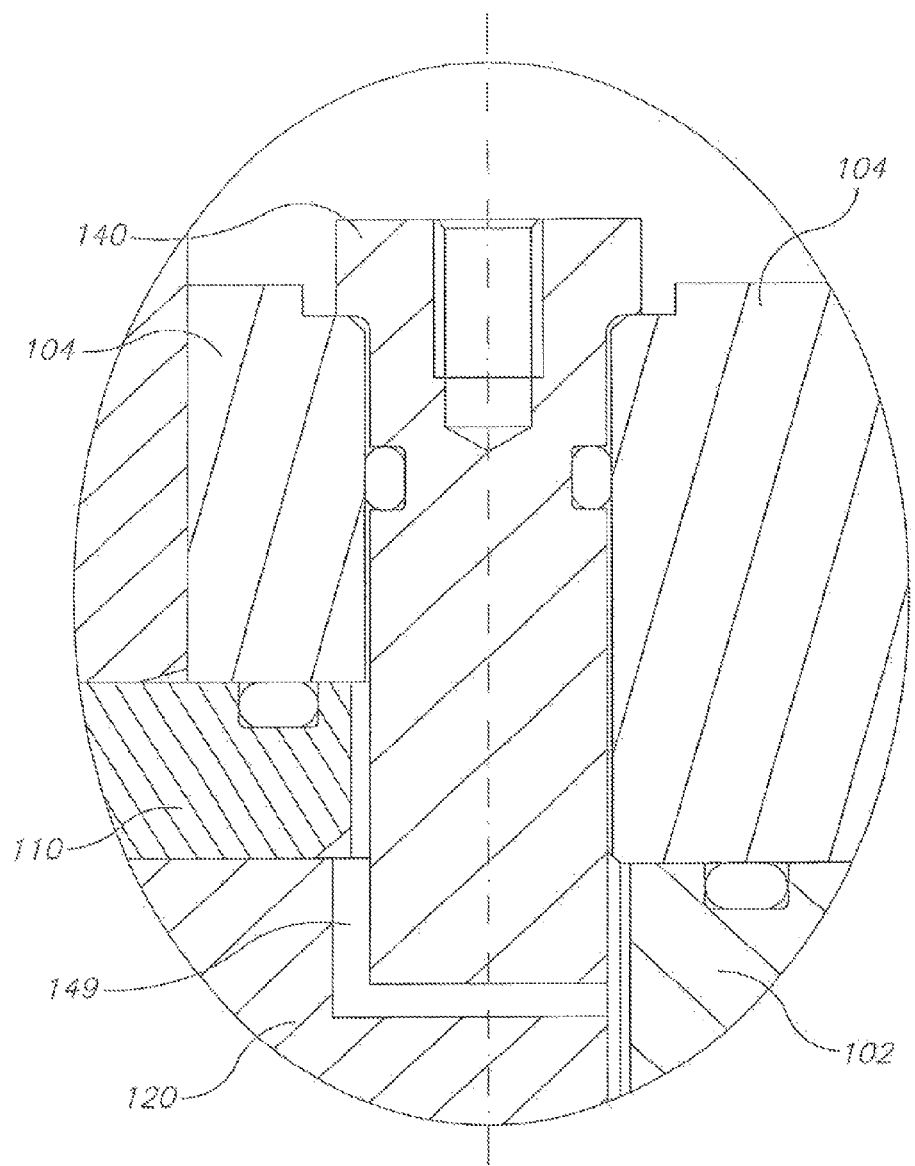
FIGS. 3E and 3F are cross sectional side views of a stabilizer of a drive shaft system, according to one embodiment of the present invention.
Figure 3F:
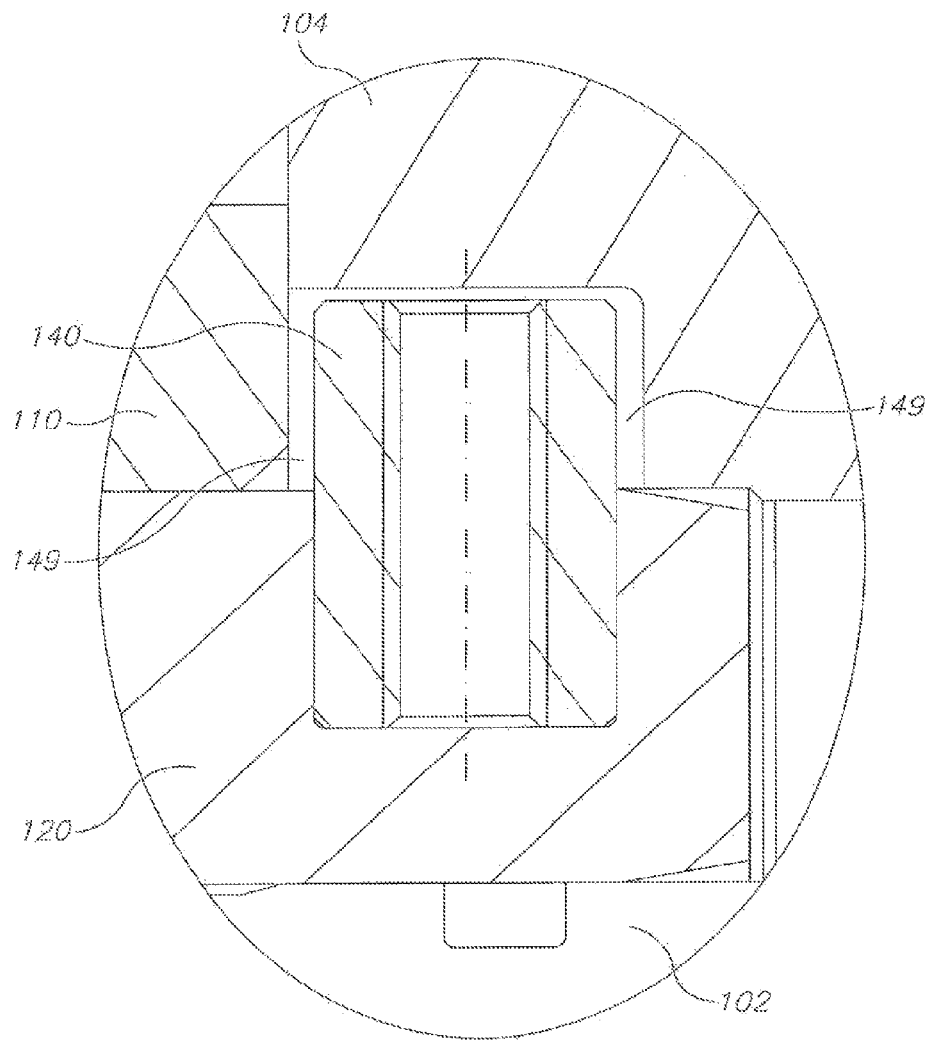

FIGS. 3E and 3F illustrate details of stabilizer 140 in cross sectional side view, according to two of the embodiments of drive shaft system 100.

FIG. 3E illustrates a pin connected to shaft housing 90 (e.g. to housing cover 104), and inserted into bearing housing 120. The axial movement of bearing housing 120 is enabled by leaving gap 149 between bearing housing 120 and stabilizer 140.

FIG. 3F illustrates a pin connected to bearing housing 120 and inserted into shaft housing 90 (e.g. between housing cover 104 and sleeve 110). The axial movement of bearing housing 120 is enabled by leaving gap 149 between sleeve 110 and stabilizer 140.

Figures 3G, 3H:
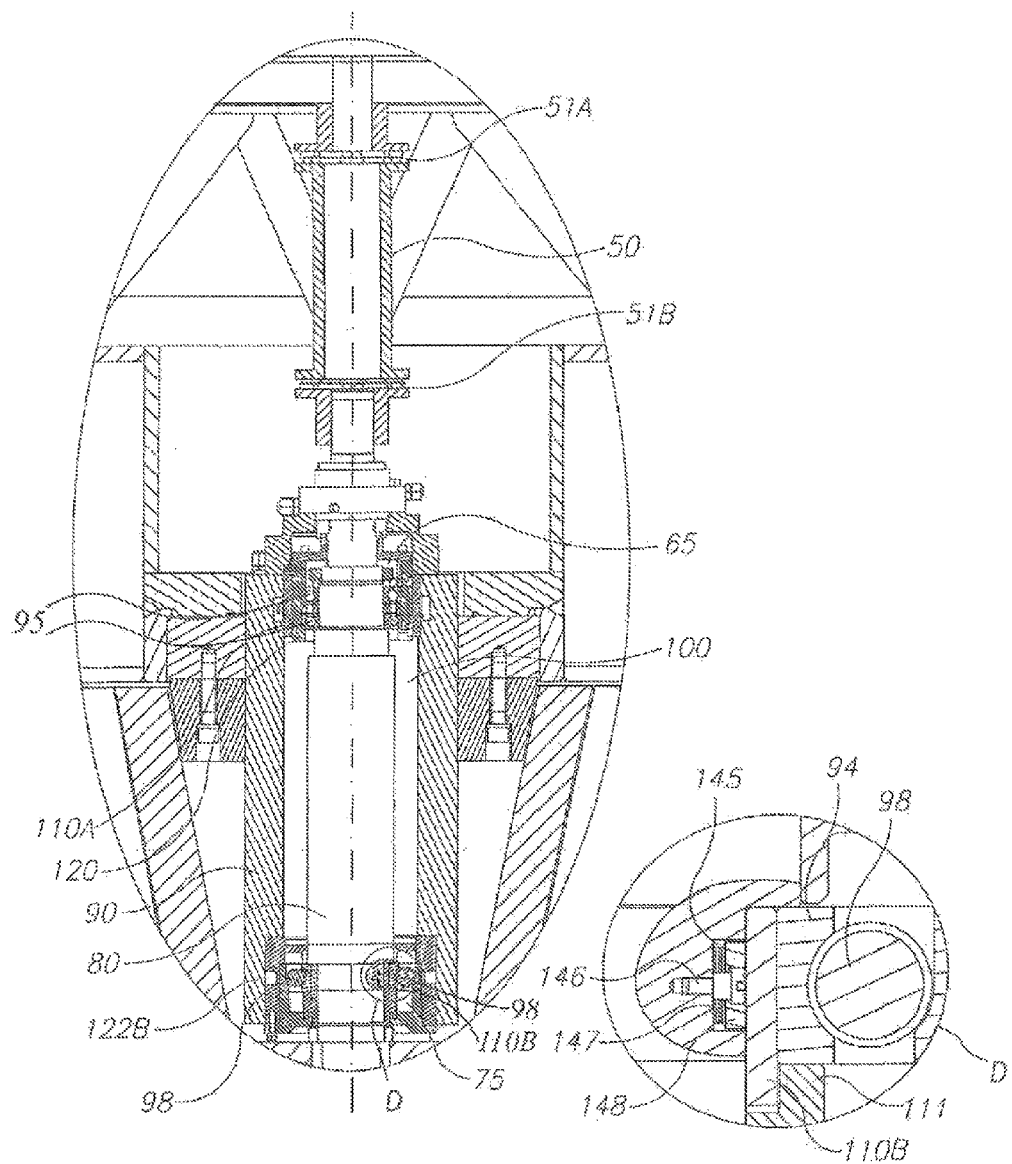
FIG. 3G is a cross sectional side view of a drive shaft system illustrating a sleeve installed on the outer surface of the shaft, according to another embodiment of the present invention.
FIG. 3H is a cross sectional side view and detail of the area marked D on the drive shaft system of FIG. 3G, according to another embodiment of the present invention.

FIGS. 3G-3H are cross sectional side views and details of a drive shaft system, according to another embodiment of the invention. FIGS. 3G and 3H illustrate sleeve 110 installed on the outer surface of shaft 80 to mediate between forcing element 145 and bearing 98's inner ring 94 to assure good transfer of force 134B (see FIG. 3B) to bearing 98. Sleeve 110 may be characterized by improved surface features in respect to the outer side of shaft 80. FIG. 3H is an enlargement of the area marked D on FIG. 3G. Forcing element 145 is arranged to force sleeve 110 against bearing 98 such as to prevent turning and radial movements of bearing 98 within sleeve 110 on shaft 80.

In embodiments of the invention, (i) motor side support 65 comprises bearing housing 120, enclosing at least one bearing 95, installed within and axially moveable along sleeve 110A installed in the shaft housing 90, and at least one forcing element 135 comprising a stabilizer 140 connected to either bearing housing 120 or shaft housing 90, and inserted into either shaft housing 90 or the bearing housing 120, respectively, to prevent turning and radial movements of bearing housing 120, and at least one spring unit 130 inserted between bearing housing 120 and sleeve 110A, to force bearing housing 120 against the inner face of sleeve 110A in a radial direction, and (ii) rotor side support 75 comprises at least one forcing element 145 comprising at least one spring unit 147 installed within shaft 80 and arranged to force at least one bearing 98 against the outer side of shaft 80, to prevent turning and radial movements of at least one bearing 98 in respect to shaft 80, and sleeve 110B installed on the outer surface of shaft 80 to mediate between at least one forcing element 145 and inner ring 94 of at least one bearing 98 to prevent turning and radial movements of at least one bearing 98 within sleeve 110B (see notation of sleeves 110A and 110B in FIG. 3G). Forcing element 145 is arranged to force sleeve 110B against bearing 98 such as to prevent turning and radial movements of bearing 98 within sleeve 110 on shaft 80. A fastening member 111 may be used to axially fixate bearing 98. In embodiments, motor side support 65 is stiffened to withstand forces delivered from flexible coupling 50, especially during starting of motor 60, and in cases of rotors 70 having a large moment of inertia. Stiffening may be achieved by using two or more bearings 95A, 95B. Stiffness may be enhanced by preloading bearings 95A, 95B during installation and fixating preloaded bearings 95A, 95B by cover 102. Gap 191 may be left between cover 102 and shaft housing 90 to enable axial movement of support 65 with thermal expansion of shaft 80.

Forcing elements 135, 145 may be combined in either supports 65, 75 or may be implemented in different supports 65, 75. For example, motor side support 65 may be implemented with forcing element 135 and rotor side support 75 with forcing element 145. Either rotor side support 75 or motor side support 65 may be affixed in shaft housing 90 while the other support (65 and 75 respectively) may be enclosed within bearing housing 120.

Either supports 65, 75 may be cooled by coolant circulating through at least one of cooling channels 122A (FIG. 3C) and 122B (FIG. 3A) respectively to reduce the thermal expansion of supports 65, 75 and the thermal expansion of shaft 80.

Figure 4A:
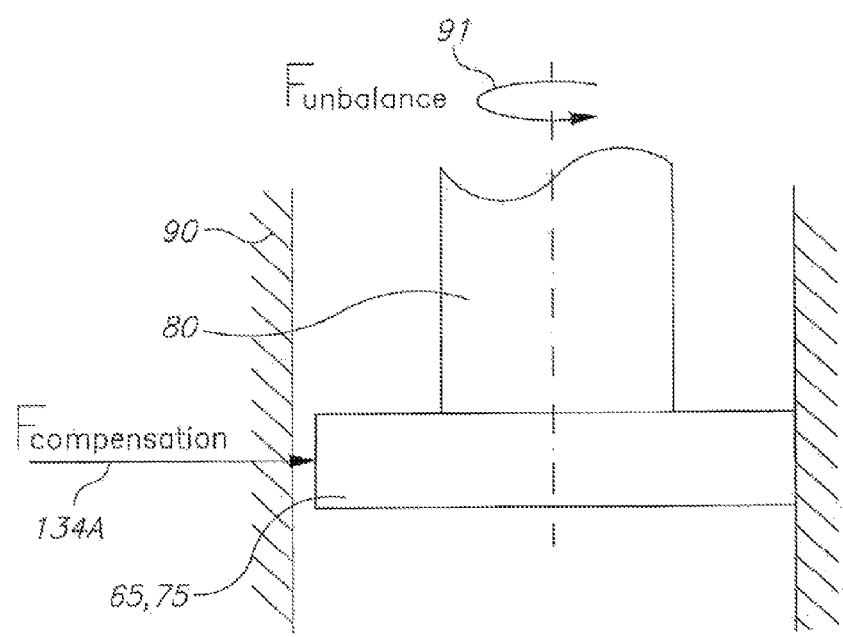
FIG. 4A is a schematic illustration and FIG. 4B is a high level flowchart, both illustrating a method according to one embodiment of the invention.
Figure 4B:
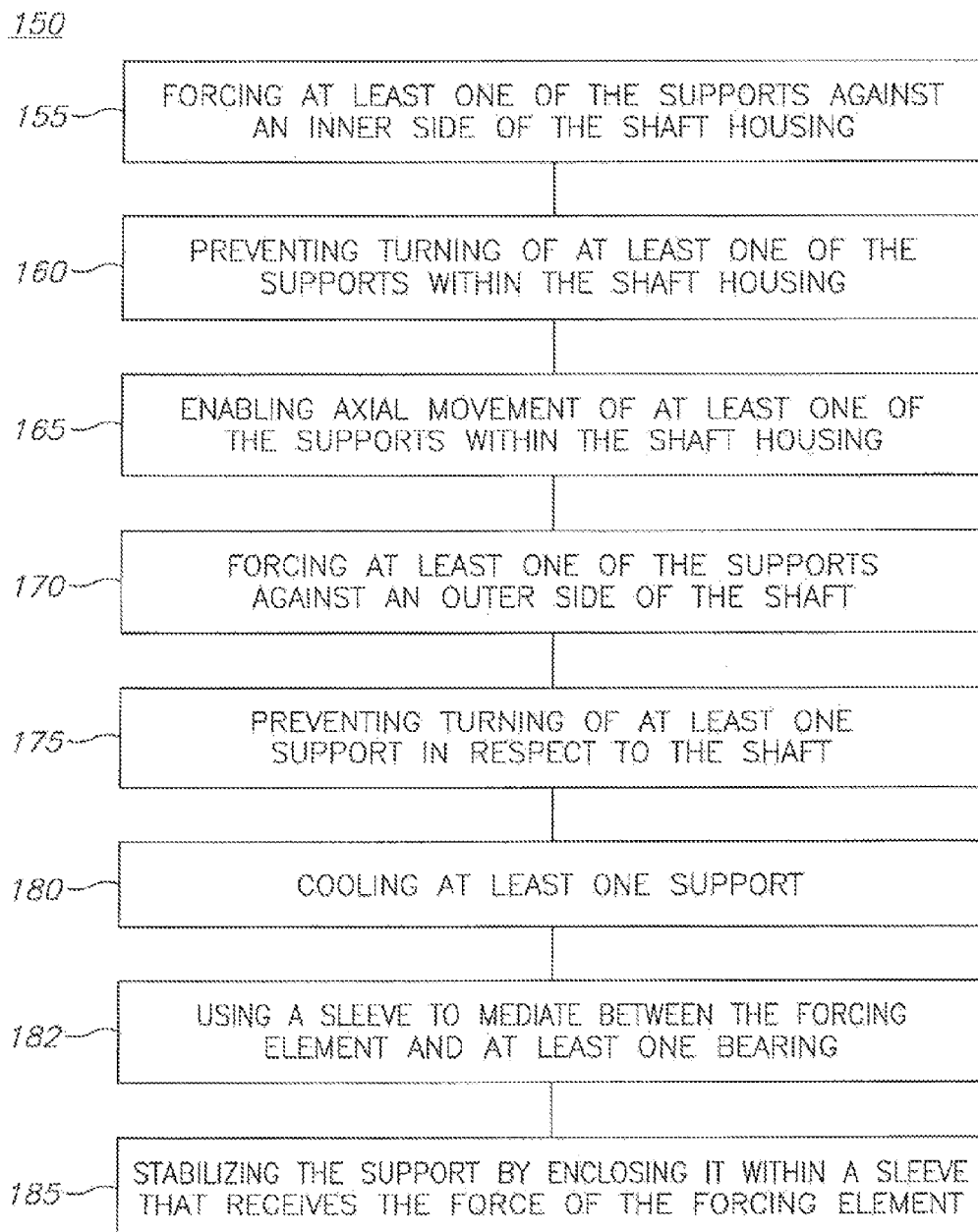

FIG. 4A and FIG. 4B illustrate schematically the application of forces 134A, 134B to overcome radial unbalance forces 91 by forcing support 65, 75 against the inner side of shaft housing 90, thereby preventing surface damage arising from impacts of supports 65, 75 against the inner side of shaft housing 90.

FIG. 4B illustrates method 150 operable in drive shaft system 100 comprising shaft 80 connected to motor 60 via coupling 50 and arranged to transmit a rotary movement from motor 60 to rotor 70, and supports 65, 75 arranged to position shaft 80 within shaft housing 90. Supports 65, 75 comprise bearings 95, 98 respectively. Method 150 comprises forcing at least one of the bearings in radial direction to prevent the at least one of the bearings from turning, while enabling axial movement of the at least one of the bearings.

Method 150 comprises any of the following stages: forcing at least one of the supports (e.g. the bearings) against an inner side of the shaft housing (stage 155); preventing turning of the supports (e.g. the bearings) within the shaft housing (stage 160); enabling axial movement of at least one of the supports within the shaft housing (stage 165); forcing at least one of the supports (e.g. the bearings) against an outer side of the shaft (stage 170); preventing turning of at least one support in respect to the shaft (stage 175); and cooling at least one support (stage 180); using a sleeve to mediate between the forcing element and at least one of the bearings (stage 182) and stabilizing either support by enclosing it within a sleeve that receives the force of the forcing element (stage 185). The sleeve may either enclose the bearings or the bearing housing in case of an external (centripetal) radial force application, or may be installed between the forcing element and the bearings or bearing housing in case of internal (centrifugal) radial force application. The invention operates within a drive shaft system that transmits torque and rotation from a motor through a flexible coupling to a rotor, such as a compressor's rotor. The drive shaft system is characterized by a large mass, a high rotation speed and a need to tolerate some thermal expansion without damage. The flexibility of the coupling, essential to protect the motor, causes large forces to be applied to the drive shaft system during the starting of the motor. The invention solves the problem of fretting damage between drive shaft bearings and the shaft housing.

The inventor has discovered that fretting damages are caused by two main mechanisms: (i) turning of a bearing against the inner face of the housing during the starting of the motor due to the large moment of inertia of the rotor and the flexibility of the coupling, and (ii) radial movements of a bearing during the high frequency rotation of the rotor. In prior art drive systems, a minimal gap is left between one of the bearings and the housing, to allow thermal expansion of the shaft. The fretting damages make the gap area rougher and increase the friction that resists the thermal expansion of the shaft. Eventually, the increased friction causes large damages to the drive system.

The disclosed solution is surprisingly to close this minimal gap to prevent radial motions, but doing so in a way that does not prevent the thermal expansion of the shaft. The bearing is enclosed within a bearing housing, which is forced on one side by a forcing element against the inner face of the shaft housing. This is possible because the vibrations are relatively small and thus the force that overcomes them is relatively small. The resulting static friction in the axial direction ($\mu$N) is likewise small in respect to the axial forces resulting from the thermal expansion and does not prohibit the expansion.

In the above description, an embodiment is an example or implementation of the invention. The various appearances of "one embodiment", "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment. Furthermore, it is to be understood that the invention can be carried out or practiced in various ways and that the invention can be implemented in embodiments other than the ones outlined in the description above.

The invention is not limited to those diagrams or to the corresponding descriptions. For example, flow need not move through each illustrated box or state, or in exactly the same order as illustrated and described.

Meanings of technical and scientific terms used herein are to be commonly understood as by one of ordinary skill in the art to which the invention belongs, unless otherwise defined.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A drive shaft system comprising a shaft, the shaft connected to a motor via a coupling and arranged to transmit a rotary movement from the motor to a rotor, wherein:
   the shaft is positioned by at least two supports within a shaft housing, at least one support comprising at least one bearing,
   wherein the at least one bearing comprises at least one of a) a bearing housing bearing enclosed within a bearing housing installed within and axially moveable along the shaft housing and b) a bearing sleeve bearing installed between the shaft housing and the shaft, and
   the drive shaft system further comprises at least one forcing element, the at least one forcing element comprising at least one of a) a bearing housing forcing element arranged to force the bearing housing against an inner side of the shaft housing or of a sleeve affixed to the shaft housing by applying a radial force on the bearing housing, while enabling axial movement of the shaft and bearing housing within the shaft housing, and b) a bearing sleeve forcing element arranged to force an outer side of the shaft against the bearing sleeve bearing or a bearing sleeve installed between the shaft and the bearing sleeve bearing by applying a radial force on the bearing sleeve or bearing sleeve bearing, while enabling axial movement of the shaft within the shaft housing,
   wherein the at least one forcing element consists of one or more linear spring units oriented in a radial direction.

2. The drive shaft system according to claim 1, wherein
   the bearing housing is installed within and is axially moveable along the sleeve affixed to the shaft housing, and
   the at least one forcing element is arranged to force the bearing housing against the inner side of the sleeve, to prevent turning and radial movements of the bearing housing within the sleeve while enabling axial movement of the bearing housing within the sleeve.

3. The drive shaft system according to claim 1,
   wherein a motor side support comprises the at least one bearing fixated by a cover in the bearing housing, arranged to enhance the stiffness of the motor side support.

4. The drive shaft system according to claim 1, wherein the at least one forcing element comprises at least one spring unit inserted between the bearing housing and the sleeve affixed to the shaft housing, and arranged to force the bearing housing against the inner face of the sleeve affixed to the shaft housing in a radial direction.

5. The drive shaft system according to claim 1,
   wherein the at least one forcing element comprises at least one spring unit inserted between the bearing housing and the sleeve affixed to the shaft housing, and arranged to force the bearing housing against the inner face of the sleeve affixed to the shaft housing in a radial direction,
   wherein the at least one spring unit comprises greasing slots arranged to lubricate the interface between the at least one spring unit and the sleeve affixed to the shaft housing.

6. The drive shaft system according to claim 1, wherein the at least one forcing element comprises at least one spring unit installed within the shaft and arranged to force the bearing sleeve bearing or bearing sleeve against the outer side of the shaft, to prevent turning and radial movements of the bearing sleeve bearing or bearing sleeve in respect to the shaft while enabling axial movement of the shaft.

7. The drive shaft system according to claim 1, wherein the at least two supports comprise a rotor side support affixed in the shaft housing, and wherein the at least one bearing is of a motor side support and is enclosed within the bearing housing.

8. The drive shaft system according to claim 1, wherein the at least two supports comprise a motor side support affixed in the shaft housing, and wherein the at least one bearing is of a rotor side support and are enclosed within the bearing housing.

9. The drive shaft system according to claim 1, wherein the at least two supports comprise a rotor side support comprising at least one forcing element, the at least one forcing element comprising at least one spring unit installed within the shaft and arranged to force the at least one bearing against the outer side of the shaft, to prevent turning and radial movements of the at least one bearing in respect to the shaft.

10. The drive shaft system according to claim 9, further comprising a sleeve installed on an outer surface of the shaft to mediate between the at least one forcing element and an inner ring of the at least one bearing, wherein the forcing element is arranged to force the sleeve against the at least one bearing to prevent turning and radial movements of the sleeve relative to the inner ring of the at least one bearing.

11. The drive shaft system according to claim 1, further comprising a cooling system arranged to cool at least one of the supports.

12. The drive shaft system according to claim 1,
wherein the at least one forcing element comprises at least one spring unit inserted between the bearing housing and a sleeve, and arranged to force the bearing housing against the inner face of the sleeve in a radial directions;
further comprising a plate fastened to the bearing housing, wherein the spring unit presses on the bearing housing on one end and the plate on the other, forcing the plate against the sleeve.

13. The drive shaft system according to claim 12, wherein the plate comprises greasing slots positioned between an outer surface of the plate and the sleeve and arranged to lubricate the interface between the plate and the sleeve.

14. The drive shaft system according to claim 1, wherein the shaft rotates within the shaft housing.

15. The drive shaft system according to claim 1, wherein the at least one forcing element further comprises a stabilizer arranged to prevent turning and radial movements of the bearing housing while allowing axial movements of the bearing housing within the shaft housing.

16. A support within a drive shaft system comprising a shaft that is connected to a motor via a coupling and arranged to transmit a rotary movement from the motor to the rotor, the support characterized in that:
the support is arranged to position the shaft in a shaft housing, the support comprising at least one bearing,
the support comprises at least one forcing element arranged to force at least one of a) a bearing housing enclosing at least one of the at least one bearing and axially movable along the shaft housing against an inner side of the shaft housing to prevent turning and radial movements of the bearing housing while allowing axial movements of the bearing housing within the shaft housing, and b) an inner side of at least one of the at least one bearing against an outer side of the shaft to prevent turning and radial movements of the shaft relative to the inner side of the at least one of the bearings while allowing axial movements of the shaft within the at least one of the at least one bearing;
wherein the at least one forcing element consists of one or more linear spring units oriented in a radial direction.

17. The support according to claim 16, further comprising a sleeve affixed to the shaft housing wherein:
a bearing housing enclosing at least one of the at least one bearing is installed within and is axially moveable along the sleeve, and
the at least one forcing element is arranged to force the bearing housing against an inner side of the sleeve.

18. The support according to claim 17, wherein:
the at least one forcing element comprises at least one spring unit inserted between the bearing housing and the sleeve, and arranged to force the bearing housing against the inner face of the sleeve in a radial direction.

19. The support of claim 16, wherein the at least one forcing element comprises at least one spring unit installed within the shaft and arranged to force an inner side of at least one of the at least one bearing against the outer side of the shaft such as to prevent turning and radial movements of the inner side of the bearing in respect to the shaft while enabling axial movement of the shaft.

20. The support of claim 19, further comprising a sleeve affixed to the shaft wherein:
the sleeve is installed within and is axially moveable along the bearing, and
the at least one forcing element is arranged to force the inner side of the at least one bearing against an outer side of the sleeve.

21. The drive shaft system according to claim 16, the support further comprising a stabilizer comprising a pin connected to either the bearing housing or the shaft housing, and inserted into either the shaft housing or the bearing housing, respectively, the pin arranged to allow axial movement of the bearing housing and prevent turning and radial movements of the bearing housing.

22. A drive shaft system comprising a shaft, the shaft connected to a motor via a coupling and arranged to transmit a rotary movement from the motor to a rotor, wherein the shaft is positioned by a motor side support and a rotor side support within a shaft housing, at least one support comprising at least one bearing, wherein:
a) the motor side support comprises:
a bearing housing, enclosing the at least one bearing, installed within and axially moveable along a sleeve installed in the shaft housing, and
at least one forcing element comprising a stabilizer connected to either the bearing housing or the shaft housing, and inserted into either the shaft housing or the bearing housing, respectively, to prevent turning and radial movements of the bearing housing, and at least one spring unit inserted between the bearing housing and the sleeve, to force the bearing housing against an inner face of the sleeve in a radial direction, and the rotor side support is fixed; or
b) the rotor side support comprises:
at least one forcing element comprising at least one spring unit installed within the shaft and arranged to force the at least one bearing against the outer side of the shaft, to prevent turning and radial movements of the at least one bearing in respect to the shaft, and
a sleeve installed on an outer surface of the shaft to mediate between the at least one forcing element and an inner ring of the at least one bearing, wherein the forcing element is arranged to force the sleeve against the at least one bearing to prevent turning and radial movements of the at least one bearing with the sleeve on the shaft, and the motor side support is fixed;

wherein the at least one forcing element consists of one or more linear spring units oriented in a radial direction.

23. A drive shaft system comprising a shaft, the shaft connected to a motor via a coupling and arranged to transmit a rotary movement from the motor to a rotor, wherein:

the shaft is positioned by at least two supports within a shaft housing, at least one support comprising at least one bearing, wherein the at least one bearing comprises at least one of a) a bearing housing bearing enclosed within a bearing housing installed within and axially moveable along the shaft housing and b) a bearing sleeve bearing installed between the shaft housing and the shaft, and the drive shaft system further comprises at least one forcing element, the at least one forcing element comprising at least one of a) a bearing housing forcing element arranged to force the bearing housing against an inner side of the shaft housing or of a sleeve affixed to the shaft housing by applying a radial force on the bearing housing, while enabling axial movement of the shaft and bearing housing within the shaft housing, and b) a bearing sleeve forcing element arranged to force an outer side of the shaft against the bearing sleeve bearing or a bearing sleeve installed between the shaft and the bearing sleeve bearing by applying a radial force on the bearing sleeve or bearing sleeve bearing, while enabling axial movement of the shaft within the shaft housing, wherein the at least one forcing element further comprises a stabilizer arranged to prevent turning and radial movements of the bearing housing while allowing axial movements of the bearing housing within the shaft housing wherein the stabilizer comprises a pin connected to either the bearing housing or the shaft housing, and inserted into either the shaft housing or the bearing housing, respectively, the pin arranged to allow axial movement of the bearing housing and prevent turning and radial movements of the bearing housing.

* * * * *